United States Patent
Ramanathan et al.

(10) Patent No.: US 11,710,298 B2
(45) Date of Patent: Jul. 25, 2023

(54) EVENT DETECTOR TRAINING

(71) Applicant: ObjectVideo Labs, LLC, Tysons, VA (US)

(72) Inventors: Narayanan Ramanathan, Chantilly, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 150 days.

(21) Appl. No.: 17/399,202

(22) Filed: Aug. 11, 2021

(65) Prior Publication Data
US 2021/0374473 A1 Dec. 2, 2021

Related U.S. Application Data

(63) Continuation of application No. 16/432,310, filed on Jun. 5, 2019, now Pat. No. 11,120,300.

(60) Provisional application No. 62/681,955, filed on Jun. 7, 2018.

(51) Int. Cl.
*G06K 9/62* (2022.01)
*G06T 7/70* (2017.01)
*G06T 7/20* (2017.01)
*G06V 20/40* (2022.01)

(52) U.S. Cl.
CPC ........... *G06K 9/6256* (2013.01); *G06T 7/20* (2013.01); *G06T 7/70* (2017.01); *G06V 20/40* (2022.01); *G06T 2207/10016* (2013.01); *G06T 2207/20081* (2013.01)

(58) Field of Classification Search
None
See application file for complete search history.

(56) References Cited

U.S. PATENT DOCUMENTS

| | | | |
|---|---|---|---|
| 9,305,216 B1 | 4/2016 | Mishra | |
| 2007/0040918 A1* | 2/2007 | Kondo | H04N 5/23254 348/241 |
| 2008/0317123 A1* | 12/2008 | Kim | G06T 7/32 375/240.08 |
| 2015/0043771 A1 | 2/2015 | Wu et al. | |
| 2017/0185872 A1 | 6/2017 | Chakraborty | |
| 2017/0286774 A1* | 10/2017 | Gaidon | G06V 10/10 |
| 2019/0114486 A1 | 4/2019 | Wang | |
| 2019/0246130 A1 | 8/2019 | Sheikh et al. | |

* cited by examiner

*Primary Examiner* — Leon Viet Q Nguyen
(74) *Attorney, Agent, or Firm* — Fish & Richardson P.C.

(57) ABSTRACT

Methods, systems, and apparatus, including computer programs encoded on a computer storage medium, for training an event detector. The methods, systems, and apparatus include actions of obtaining frames of a video, determining whether an object of interest is detected within the frames, determining whether motion is detected within the frames, determining whether the frames correspond to motion by an object of interest, generating a training set that includes labeled inter-frame differences based on whether the frames correspond to motion by an object of interest, and training an event detector using the training set.

20 Claims, 2 Drawing Sheets

EVENT DETECTOR TRAINING

CROSS REFERENCE TO RELATED APPLICATIONS

This application is a continuation of U.S. application Ser. No. 16/432,310, filed Jun. 5, 2019, now allowed, which claims the benefit of U.S. Provisional Application No. 62/681,955, filed on Jun. 7, 2018, titled "EVENT DETECTOR TRAINING." Both of these prior applications are incorporated by reference in their entirety.

TECHNICAL FIELD

This disclosure application relates generally to monitoring systems, and more particularly, to detecting events.

SUMMARY

Techniques are described for training an event detector. Real-time object detection may be of high importance in many video surveillance applications. Time critical events such as an unauthorized individual or vehicle entering a secure facility, unknown individuals loitering in home neighborhoods, a child entering a swimming pool in the absence of adult supervision, may each demand instant notification to a user. Deep learning driven object detection solutions may be extremely accurate in detecting objects such as human, vehicle, animals and boxes. However, such solutions may be computationally intensive and as a result need continuous access to powerful graphical processing unit (GPU) cards to operate in real-time. Such a requirement may increase the cost associated with surveillance applications and renders the application out of reach for most consumers from a price stand-point. In addition, latency in event notifications may be unavoidable when such GPU based object detection algorithms are run on remote servers or on the cloud.

An event detection system may identify instances when objects of interest moved within a scene or region of interest. An object of interest may be a type of object that is to be monitored by the system, e.g., humans, vehicles, pets, etc. The system may provide improvement in that problems with sensitivity to illumination changes, inclement weather conditions, constantly moving insignificant objects within scenes such as trees, insects, and debris may be reduced. The system may use highly accurate object detectors to automatically annotate instances of importance, extract a distinguishable and easy to learn signature from such instances, and build a classifier that detects events involving motion of objects of interest.

In some implementations, the event detection system may capture temporal characteristics of events by using randomized frame rates in computing the inter-frame differences, thereby being able to learn inter-frame differences pertaining to an event executed in different speeds. For example, the system may learn to detect human walking, human running, and human jogging by adjusting frame rates in generating the training set of inter-frame difference images. Accordingly, even if the system has been provided only samples of people walking at regular pace, the system may detect instances of people running/jogging by capturing inter-frame differences at lowered frame rates.

In some implementations, the event detection system may detect motion events pertaining to multiple objects, thereby gaining the ability to detect a new event type. For example, the event detection system may detect a person walking down the driveway as a "Person event" and the same person walking down the driveway pulling a trash can along as "Person keeping the trash out." The system may do so based on three aspects, object detectors indicating presence of objects in the scene with high confidence, motion/change detectors indicating motion in the frames with high confidence, and attributing that the detected motion and detect object were both from the same localized region. The last aspect may be a strong indication that the motion/change event pertained to the detected object. For example, instances where two objects were detected on multiple frames, motion was observed on all the frames, and motion detection being attributed to both the detected objects within the same localized region may be a strong indication of two disjoint objects moving in unison. When the two disjoint objects are a human and trash can, the event may be detected as "Person taking out the trash." When the two disjoint objects are a Person and lawn mower, the event may be detected as "Person mowing."

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

Like reference numbers and designations in the various drawings indicate like elements

DETAILED DESCRIPTION

Techniques are described for training an event detector.

Figure 1:
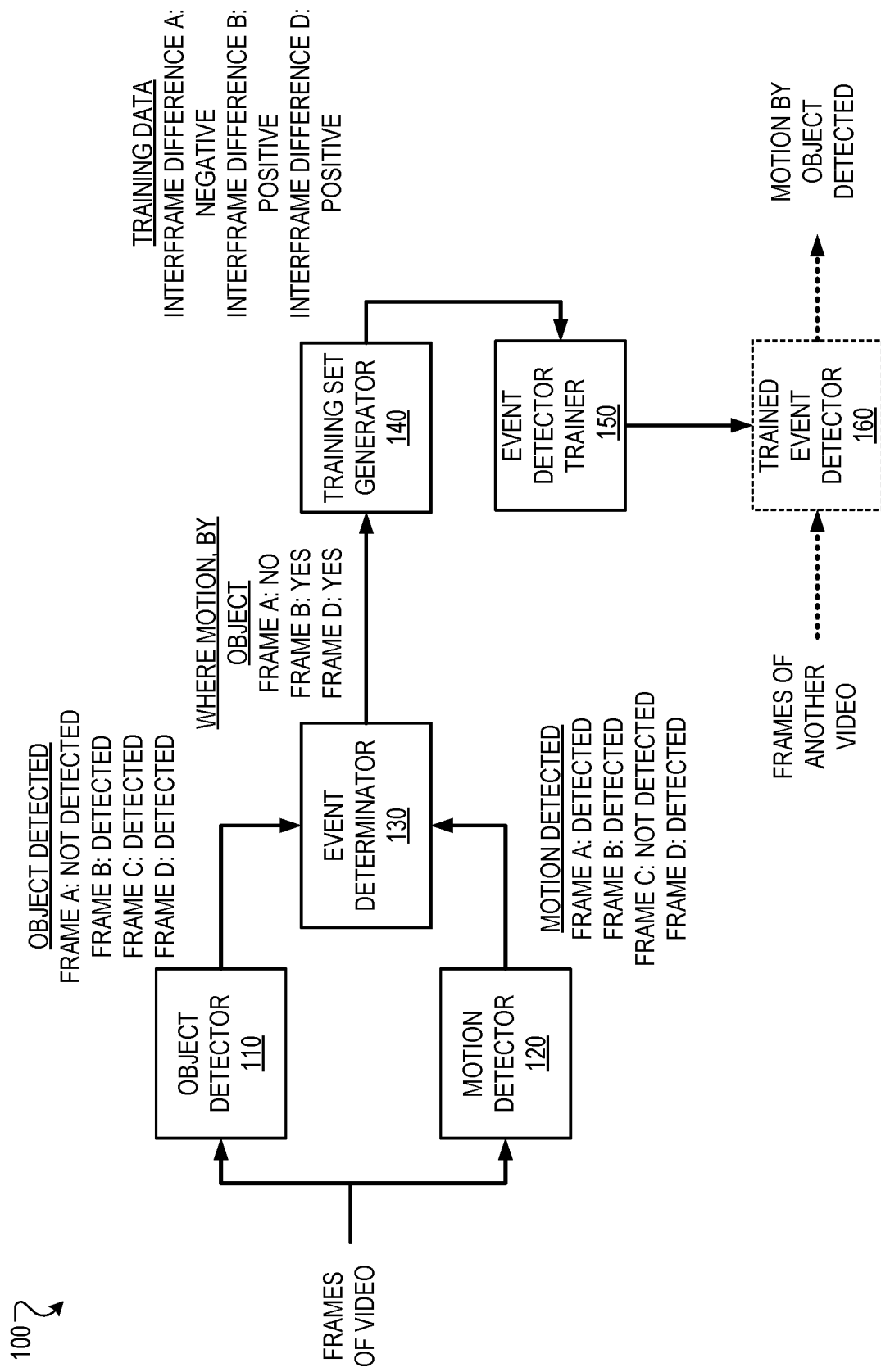
FIG. 1 illustrates an example block diagram of a system for training an event detector.

FIG. 1 illustrates an example block diagram of a system 100 for training an event detector. The system 100 includes an object detector 110 that detects objects of interest in frames of video, a motion detector 120 that detects motion in frames of video, an event determinator 130 that determines whether frames correspond to motion by an object of interest, a training set generator 140 that generates a training set based on the determinations whether frames correspond to motion by an object of interest, and an event detector trainer 150 that trains an event detector 160 to detect motion by the object of interest. The trained event detector 160 may then obtain frames of another video and determine whether the frames of the other video include motion by an object of interest.

In some implementations, the motion detector 120 may be a change detector that detects change and references made in this disclosure to detection of motion may instead refer to detection of change. For example, a change detector may detect a change of state, e.g., car headlights turning on or off, or a car door opening.

The trained event detector 160 may, one or more of, use less processing power or process faster than the object detector 110 and the motion detector 120. Accordingly, processing power may be reduced or processing speed may be increased by using the trained event detector 160 on frames of video instead of using the object detector 110 and the motion detector 120. Additionally, the trained event detector 160 may more accurately detect when frames include motion by an object of interest than the object detector 110 and the motion detector 120 as neither the object detector 110 nor the motion detector 120 may be specifically detecting for motion by an object of interest.

The object detector 110 may detect objects of interest in frames of video. For example, the object detector 110 may obtain frames of a video of a front door and determine that in Frame A human is not detected, in Frame B a human is detected, in Frame C a human is detected, and in Frame D a human is not detected. The object detector 110 may detect objects of interest based on the pixels within a single frame of video. For example, the object detector 110 may detect a human in a single frame of video based on determining that the pixels in the single frame show a shape that matches a shape of a human, or broadly any visual characteristic (gradients, individual body parts—face/torso/limbs) that is attributed to that of a human. The object detector 110 may output a label for each frame that indicates whether an object of interest was detected in the frame. For example, for Frame A, B, C, and D, the object detector 110 may output labels of "Not detected," "detected," "detected," and "detected," respectively. In some implementations, the labels may be a binary value where a first value indicates "not detected" and a second different value indicates "detected."

The motion detector 120 may detect motion in frames of video. For example, the motion detector 120 may detect motion in Frame A, detect motion in Frame B, not detection motion in Frame C, and detect motion in Frame D. The motion detector 120 may detect motion in frames of video based on background subtraction detection. For example, the motion detector 120 may detect that a sample frame includes motion based on determining that 2%, 5%, 10%, or some other amount of the pixels in the sample frame have different values than the frame in the video immediately before the sample frame. In another, the motion detector 120 may detect that a sample frame does not include motion based on determining that less than 2%, 5%, 10%, or some other amount of the pixels in the sample frame have different values than the frame in the video immediately before the sample frame. The motion detector 120 may output a label for each frame that indicates whether motion was detected in the frame. For example, for Frame A, B, C, and D, the motion detector 120 may output labels of "detected," "detected," "not detected," and "detected," respectively.

The event determinator 130 may determine what frames correspond to motion by an object of interest. For example, the event determinator 130 may determine that Frame A did not include motion by an object of interest, Frame B did include motion by an object of interest, and Frame D did include motion by an object of interest. The event determinator 130 may determine which frames correspond to motion by an object of interest based on whether the object detector 110 detected an object of interest in the frame and whether the motion detector 120 detected motion in the frame.

In some implementations, the event determinator 130 may determine a frame corresponds to motion by an object of interest only if both the object detector 110 detected an object of interest in the frame and the motion detector 120 detected motion in the same frame and, in some implementations, within the same portion of the frame. For example, the event determinator 130 may determine an object of interest was not detected in Frame A and motion was detected in Frame A and, in response, determine Frame A does not correspond to motion by an object of interest. In another example, the event determinator 130 may determine an object of interest was detected in Frame B and motion was detected in Frame B and, in response, determine Frame B does correspond to motion by an object of interest.

The event determinator 130 may output a label for frames in which motion was detected by the motion detector 120, where the label indicates whether motion by object of interest was determined in the frame. For example, for Frames A, B, and D, the event determinator 130 may output labels of "No," "Yes," and "Yes," respectively. In some implementations, the labels may be a binary value where a first value indicates "No" and a second different value indicates "Yes." In some implementations, the event determinator 130 may not output a label for frames in which motion was not detected, whether or not an object of interest was detected, as the inter-frame differences for frames in which motion was not detected may not include useful data. For example, as a frame in which no motion is detected may be substantially identical to a prior frame, then the inter-frame difference for the frame in which no motion may be substantially empty.

The training set generator 140 may generate a training set based on the determinations on whether frames correspond to motion by an object of interest. For example, the training set generator 140 may generate a training set that includes inter-frame differences for Frame A in a negative set or labeled as negative and that includes inter-frame differences for Frames B and D in a positive set or labeled as positive. The training set generator 140 may label inter-frame differences for a frame as positive or include inter-frame differences for a frame in a positive set in response to a determination by the event determinator 130 that the frame corresponds to motion by an object of interest. The training set generator 140 may label inter-frame differences for a frame as negative or include inter-frame differences for a frame in a negative set in response to a determination by the event determinator 130 that the frame does not correspond to motion by an object of interest.

The training set generator 140 may generate the inter-frame differences by subtracting adjacent frames and normalizing image differences, e.g., between a range of zero to one. In some implementations, the motion detector 120 may be set to a high sensitivity that weights towards detecting motion in frames so that more inter-frames labeled as negative are generated for training. In some implementations, the training set generator 140 may also identify regions in frames that not important to detection of motion by an object of interest and mask out in the inter-frames, e.g., zero out, regions that are not of importance.

In some implementations, the training set generator 140 may generate the inter-frame differences by stacking frames on top of each other so that common pixels begin to have a higher saturation level, and then do the same with the pixels to be subtracted so that the highly saturated areas within the two sets of stacked pixels are subtracted removing jittering objects like bushes or trees, or inconsistently exposed pixels from lights or shiny objects, and leaving only the tracks of the smoothly moving objects. For example, the training set generator 140 may perform "frame 1−frame 2=diff1," "frame 2−frame 3=diff2," . . . , and then "(diff1+diff2+diff3)−(diff4+diff5+diff6)" to result in an inter-frame difference. The number of frames to stack may depend on the scenarios. For example at night in infrared mode the generator 140 may stack more frames than in a consistently lit indoor environment will little spurious movement, for which no frames may be stacked. Stacking frames may be useful for removing distractors that may just be moving back and forth in the same pixel space, but preserve the flowing objects that are moving consistently across the pixel space, such as a person, animal, or vehicle.

The event detector trainer 150 may obtain the training set generated by the training set generator 140 and train an event detector 160 to detect motion by an object of interest. For example, the event detector trainer 150 may obtain a training set that includes inter-frame differences for Frame A in a negative set and that includes inter-frame differences for Frames B and D in a positive set and generate the trained event detector 160. The event detector trainer 150 may train a neural network using the inter-frame differences for each frame as the input to the neural network and the label as the desired output of the neural network for that particular input. The neural network that is trained may be a deep network that includes fewer parameters than an object detector.

In some implementations, the event detector trainer 150 may obtain validation data that includes labeled inter-frame differences that can be used to validate whether the event detector 160 is performing sufficiently accurately. For example, the event detector trainer 150 may determine that an event detector that is being trained is only correctly detecting motion by an object of interest in 50% of the validation set and, in response, continue to train the event detector using additional training data generated by additional video captured by a camera. In another example, the event detector trainer 150 may determine that an event detector that is being trained is correctly detecting motion by an object of interest in 98% of the validation set and, in response, determine that the event detector is sufficiently trained.

The trained event detector 160 may then receive frames of another video and detect whether each frame includes motion by an object of interest. For example, the trained event detector 160 may obtain additional frames of video taken by the same camera that provided the frames of video used to train the event detector and determine whether each frame includes motion by an object of interest, where the determination is performed within seconds of the additional frames of video being taken by the same camera.

In some implementations, the system 100 may be performed by a server that is remote to a camera that captures the frames of video and the trained event detector 160 may be transmitted to the camera so that the camera may then use the trained event detector 160 to detect whether frames include motion by an object of interest. The camera may then only store or transmit frames of video in which motion by an object of interest is detected, saving storage, bandwidth usage, and power usage by the camera.

In some implementations, the system 100 may identify a video from another camera that provides a similar view and also use the trained event detector 160 for that other camera. For example, the system 100 may determine that a camera height, size of objects, or type of scene shown by the other camera is similar to the camera for which the event detector is trained and, in response, also transmit the trained event detector 160 to the other camera.

In some implementations, the system 100 may detect multiple different types of objects of interest and may generate a respective trained event detector that corresponds to each type of object of interest. For example, the system may use a first object detector that only detects humans to generate an event detector that detects motion by humans, a second object detector that only detects vehicles to generate an event detector that detects motion by vehicles, etc. The multiple trained event detectors may then process frames of video in parallel.

In some implementations, the system 100 may detect motion by multiple objects of interest. For example, an event to detect may be a person moving a trash can so the system 100 may include a human detector that detects humans, a trash can detector that detects trash cans, and an event determinator 130 that labels a frame as including simultaneous motion by both humans and trash cans when the human detector indicates a human is detected, the trash can detector indicates a trash can is detected, and the motion detector indicates motion is detected, and then generate from the labels an event detector that detects simultaneous movement of both a human and a trash can.

In some implementations, when a system generates an event detector based on two different object detectors, the system may also generate respective event detectors that detect motion by the respective object as described above, and then process frames of video using all three event detectors. For example, a system using all three detectors may only consider a frame as including simultaneous movement of both a human and a trash can when all three event detectors indicate motion by the respective object or objects, which may reduce false positives from just using the event detector that detects simultaneous movement of both a human and a trash can. The combination of detections may result in a labeling of a specific activity. For example, detection of movement of a human, movement of a trash can, and movement of a human and trash can may result in a labeling of a frame as "person taking out trash."

In some implementations, the system 100 may train event detectors for objects of interest that move at different speeds. For example, vehicles may move more quickly than people. Accordingly, while generating the inter-frame differences, the system 100 may use randomized frame rates, e.g., ranging from 1 frames per second (fps) to 25 fps, where the adjacent frames selected for creating the training set would be different for each frame rate.

In more detail in regards to different speeds, the system 100 may vary frame rates in gathering interframe differences so that the system 100 generates inter-frame differences that resemble running/jogging by gathering inter-frame differences staggered by more frames (e.g., one frame per second as against ten frames per second) from that of a person walking. For example, for an event of a person walking let frame A1, A2, . . . A10 correspond to the ten frames from a one second duration for a video captured at ten fps. The inter-frame differences obtained from (A2, A1), (A4,A3) etc. capture walking characteristics. Inter-frame differences obtained from (A5, A1), (A6,A2) could capture jogging/running instances.

In some implementations the motion detector 120 may detect localized motion in a vicinity of an object detected by the object detector 110. For example, the motion detector 120 may determine that motion is detected within ten pixels of a vehicle detected by the object detector 110, e.g., when the vehicle is moving, and, in response, determine there is object localized motion in the frame. In another example, the motion detector 120 may determine that motion is not detected within ten pixels of a vehicle detected by the object detector 110, e.g., when a background object is moving, and, in response, determine there is no object localized motion in the frame. In yet another example, the motion detector 120 may determine that motion is detected throughout an image, e.g., when it is raining, and, in response, determine there is no object localized motion. The motion detector 120 may receive a location of an object detected by the object detector 110 within a frame to determine whether motion is object localized motion near the vicinity of the detected object.

The event determinator 130 may then determine there is motion by an object when the motion detector 120 indicated there is object localized motion and determine there is no motion by an object when the motion detector 120 indicated there is no object localized motion. In some implementations, the event determinator 130 may similarly determine whether motion detected by the motion detector 120 is object localized motion instead of the motion detector 120 determining whether there is object localized motion. Accordingly, the training set generator 140 may then generate negative inter-frame differences that correspond to motion that is not object localized motion so the non-object localized motion may be ignored. For example, spider webs or insects moving may be determined to be motion that is not localized around a vehicle and, in response, inter-frame differences indicating motion by spider webs or insects may be generated as a negative samples.

Figure 2:
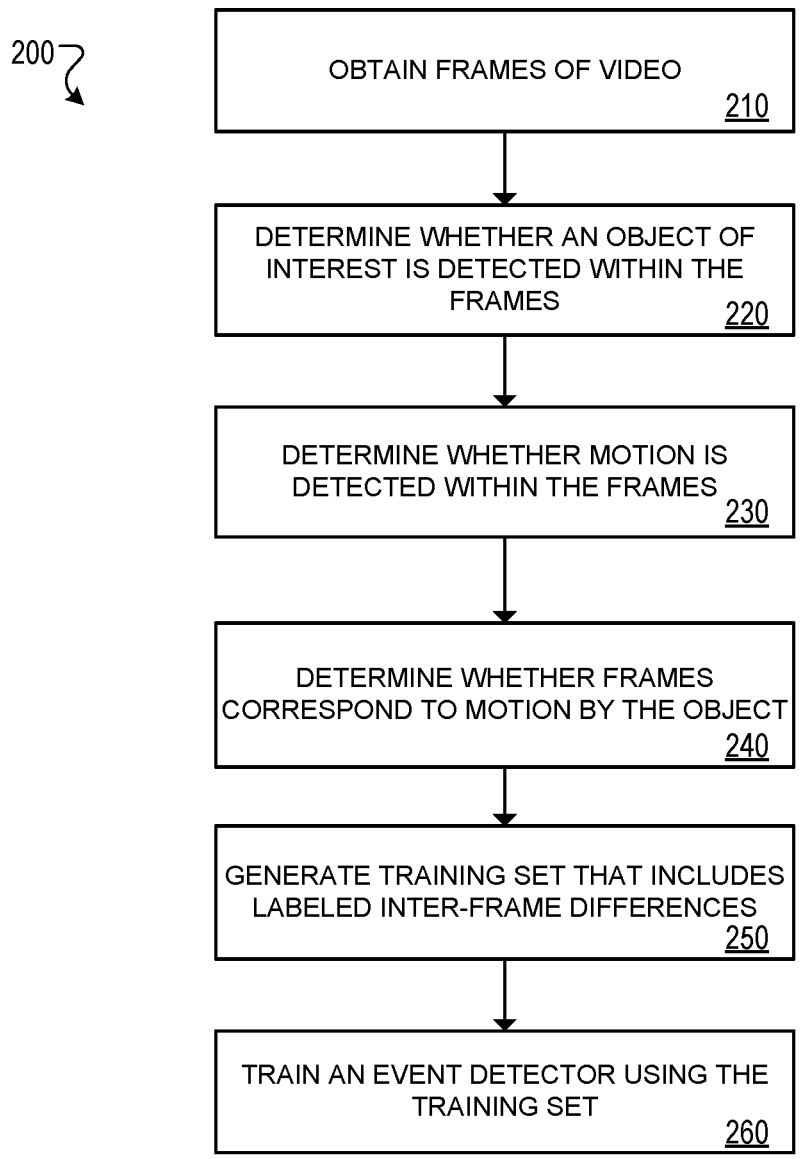
FIG. 2 is a flow diagram of an example process for training an event detector.

FIG. 2 is a flow diagram of an example process 200 for training an event detector. Process 200 can be implemented using system 100 described above. Thus, descriptions of process 200 may reference one or more of the above-mentioned components, modules, or computational devices of system 100. In some implementations, described actions of process 200 are enabled by computing logic or software instructions executable by a processor and memory of an example electronic device.

The process 200 includes obtaining frames of video (210). For example, a server may receive, from a camera, Frames A, B, C, and D of video captured by the camera and provide the frames to the object detector 110 and the motion detector 120.

The process 200 includes determining whether an object of interest is detected within the frames (220). For example, the object detector 110 may determine that Frames A, B, C, and D do not include a human, do include a human, do include a human, and do include a human, respectively. In some implementations, determining whether an object of interest is detected within the frames includes, for each of the frames of the video, determining whether an object of one or more types is shown in the frame. For example, the object detector 110 may determine that Frame A does not include an object that is a human, vehicle, or pet and Frames B, C, and D do include an object that is a human, vehicle, or pet.

The process 200 includes determining motion is detected within the frames (230). For example, the motion detector 120 may determine that Frames A, B, C, and D include motion, include motion, do not include motion, and do include motion, respectively. As discussed above, in some implementations, the motion detector 120 may determine motion was near a vicinity of an object detected by the object detector 110.

In some implementations, determining whether motion is detected within the frames includes, for each of the frames of the video except for a first frame of the frames of the video, determining whether an object has moved compared to a prior frame of the frames of the video. For example, the motion detector 120 may determine that Frames A, B, and D show an object as having moved from an immediately prior frame and Frame C does not show an object as having moved from an immediately prior frame.

The process 200 includes determining whether frames correspond to motion by the object (240). For example, the event determinator 130 may determine from the object detector 110 determinations that Frames A, B, C, and D do not include a human, do include a human, do include a human, and do include a human, respectively, and the motion detector 120 determinations that Frames A, B, C, and D include motion, include motion, do not include motion, and do include motion, respectively, that Frames A, B, and D do not correspond to motion by a human, do correspond to motion by a human, and do correspond to motion by a human, respectively.

In some implementations, determining whether the frames correspond to motion by an object of interest includes, for each of the frames of the video except for the first frame of the frames of the video, determining whether both an object has moved compared to the prior frame and an object of the one or more types is shown in the frame. For example, the event determinator 130 may determine, for Frame A, that the object detector 110 indicated that Frame A does not include an object of interest and the motion detector 120 indicated that there was motion in Frame A from the immediate prior frame and, in response, determine that Frame A does not correspond to motion by an object of interest, determine, for Frame B, that both the object detector 110 indicated that Frame B includes an object of interest and the motion detector 120 indicated that there was motion in Frame B from the immediate prior frame and, in response, determine that Frame B does correspond to motion by an object of interest, determine, for Frame C, that the object detector 110 indicated that Frame C includes an object of interest and the motion detector 120 indicated that there was not motion in Frame C from the immediate prior frame and, in response, determine that Frame C does not correspond to motion by an object of interest, and determine, for Frame D, that both the object detector 110 indicated that Frame D includes an object of interest and the motion detector 120 indicated that there was motion in Frame D from the immediate prior frame and, in response, determine that Frame D does correspond to motion by an object of interest.

The process 200 includes generating a training set that includes labeled inter-frame differences (250). For example, the training set generator 140 may generate a positive training set that includes inter-frame differences for Frames B and D and a negative training set that includes inter-frame differences for Frame A.

In some implementations, generating a training set that includes labeled inter-frame differences based on whether the frames correspond to motion by an object of interest includes, for each of the frames determined that both an object has moved compared to the prior frame and an object of the one or more types is shown in the frame, including in the training set an inter-frame that represents differences between the frame and the prior frame and that is labeled as showing motion of an object of interest.

For example, the training set generator 140 may receive an indication of "Frame B: Yes" from the event determinator 130 and, in response, generate an inter-frame that represents a difference between Frame B and Frame A, which was the frame immediately before Frame B, and label that inter-frame as "Positive." In another example, the training set generator 140 may receive an indication of "Frame D: Yes" from the event determinator 130 and, in response, generate an inter-frame that represents a difference between Frame D and Frame C, which was the frame immediately before Frame D, and label that inter-frame as "Positive."

In some implementations, generating a training set that includes labeled inter-frame differences based on whether the frames correspond to motion by an object of interest includes, for each of the frames determined that both an object has moved compared to the prior frame and an object of the one or more types is not shown in the frame, including in the training set an inter-frame that represents differences between the frame and the prior frame and that is labeled as not showing motion of an object that is of interest. For example, the training set generator 140 may receive an indication of "Frame A: No" from the event determinator 130 and, in response, generate an inter-frame that represents a difference between Frame A and the frame immediately before Frame A in the video and label that inter-frame is "Negative."

In some implementations, generating a training set that includes labeled inter-frame differences based on whether the frames correspond to motion by an object of interest includes, for each of the frames determined that an object has not moved compared to the prior frame, not including in the training set an inter-frame that represents differences between the frame and the prior frame. For example, in response to determining that the motion detector 120 indicated that there was no motion in Frame C, the event determinator 130 may not provide an indication regarding whether Frame C includes motion by an object of interest to the training set generator 140 which may cause the training set generator 140 to not include an inter-frame that represents differences between Frame C and Frame B in the training set.

The process 200 includes training an event detector using the training set (260). For example, the event detector trainer 150 may train an event detector using a training set that includes inter-frame differences for Frames B and D that are labeled as positive and inter-frame differences for Frame A that are labeled as negative.

In some implementations, the process 200 includes providing frames of a second video to the trained event detector and receiving, from the trained event detector, an indication whether the frames of the second video show motion of an object of interest. For example, frames of another video captured from a home may be provided to the trained event detector 160 and the trained event detector 160 may output a classification for each of the frames that indicates whether or not the frame includes motion by an object of interest.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   obtaining a trained event detector,
      wherein the trained event detector was trained with a training set that includes:
         a first interframe image that both (i) is labeled as showing motion not by an object of interest and (ii) includes a respective pixel for each pixel in a first frame, where the respective pixels in the first interframe image represent differences in corresponding pixels between the first frame and a first prior frame; and
         a second interframe image that both (i) is labeled as showing motion by an object of interest and (ii) includes a respective pixel for each pixel in a second frame, where the respective pixels in the second interframe image represent differences in corresponding pixels between the second frame and a second prior frame;
   obtaining a third prior frame and a third frame of a video;
   determining a third interframe image from the third prior frame and the third frame of the video;
   providing the third interframe image to the trained event detector; and
   receiving, from the trained event detector, an indication whether the third prior frame and the third frame of the video show motion of an object of interest.

2. The method of claim 1, wherein the third interframe image includes a respective pixel for each pixel in the third frame, where the respective pixels in the third interframe image represent differences in corresponding pixels between the third frame and the third prior frame.

3. The method of claim 1, wherein determining a third interframe image from the third prior frame and the third frame of the video comprises:
   normalizing differences in values between respective pixels in the third frame and the third prior frame.

4. The method of claim 1, wherein normalizing differences in values between respective pixels in the third frame and the third prior frame comprises:
   normalizing each pixel in the third interframe image to a value within a range of zero to one.

5. The method of claim 1, wherein determining a third interframe image from the third prior frame and the third frame of the video comprises:
   identifying regions that are not important to detection of motion by an object of interest; and
   masking out the regions in the third interframe image.

6. The method of claim 1, wherein determining a third interframe image from the third prior frame and the third frame of the video comprises:

determining a first prestacked image from the third prior frame and the third frame;
determining a second prestacked image from a fourth prior frame and a fourth frame; and
determining the third interframe image based on a combination of the first prestacked image and the second prestacked image.

7. The method of claim 1, wherein obtaining a trained event detector comprises at least one of:
receiving, by a camera and from a server, the trained event detector; or
generating, by the server, the trained event detector.

8. A system comprising:
one or more computers and one or more storage devices storing instructions that are operable, when executed by the one or more computers, to cause the one or more computers to perform operations comprising:
obtaining a trained event detector,
wherein the trained event detector was trained with a training set that includes:
a first interframe image that both (i) is labeled as showing motion not by an object of interest and (ii) includes a respective pixel for each pixel in a first frame, where the respective pixels in the first interframe image represent differences in corresponding pixels between the first frame and a first prior frame; and
a second interframe image that both (i) is labeled as showing motion by an object of interest and (ii) includes a respective pixel for each pixel in a second frame, where the respective pixels in the second interframe image represent differences in corresponding pixels between the second frame and a second prior frame;
obtaining a third prior frame and a third frame of a video;
determining a third interframe image from the third prior frame and the third frame of the video;
providing the third interframe image to the trained event detector; and
receiving, from the trained event detector, an indication whether the third prior frame and the third frame of the video show motion of an object of interest.

9. The system of claim 8, wherein the third interframe image includes a respective pixel for each pixel in the third frame, where the respective pixels in the third interframe image represent differences in corresponding pixels between the third frame and the third prior frame.

10. The system of claim 8, wherein determining a third interframe image from the third prior frame and the third frame of the video comprises:
normalizing differences in values between respective pixels in the third frame and the third prior frame.

11. The system of claim 8, wherein normalizing differences in values between respective pixels in the third frame and the third prior frame comprises:
normalizing each pixel in the third interframe image to a value within a range of zero to one.

12. The system of claim 8, wherein determining a third interframe image from the third prior frame and the third frame of the video comprises:
identifying regions that are not important to detection of motion by an object of interest; and
masking out the regions in the third interframe image.

13. The system of claim 8, wherein determining a third interframe image from the third prior frame and the third frame of the video comprises:
determining a first prestacked image from the third prior frame and the third frame;
determining a second prestacked image from a fourth prior frame and a fourth frame; and
determining the third interframe image based on a combination of the first prestacked image and the second prestacked image.

14. The system of claim 8, wherein obtaining a trained event detector comprises at least one of:
receiving, by a camera and from a server, the trained event detector; or
generating, by the server, the trained event detector.

15. A non-transitory computer-readable medium storing software comprising instructions executable by one or more computers which, upon such execution, cause the one or more computers to perform operations comprising:
obtaining a trained event detector,
wherein the trained event detector was trained with a training set that includes:
a first interframe image that both (i) is labeled as showing motion not by an object of interest and (ii) includes a respective pixel for each pixel in a first frame, where the respective pixels in the first interframe image represent differences in corresponding pixels between the first frame and a first prior frame; and
a second interframe image that both (i) is labeled as showing motion by an object of interest and (ii) includes a respective pixel for each pixel in a second frame, where the respective pixels in the second interframe image represent differences in corresponding pixels between the second frame and a second prior frame;
obtaining a third prior frame and a third frame of a video;
determining a third interframe image from the third prior frame and the third frame of the video;
providing the third interframe image to the trained event detector; and
receiving, from the trained event detector, an indication whether the third prior frame and the third frame of the video show motion of an object of interest.

16. The medium of claim 15, wherein the third interframe image includes a respective pixel for each pixel in the third frame, where the respective pixels in the third interframe image represent differences in corresponding pixels between the third frame and the third prior frame.

17. The medium of claim 15, wherein determining a third interframe image from the third prior frame and the third frame of the video comprises:
normalizing differences in values between respective pixels in the third frame and the third prior frame.

18. The medium of claim 15, wherein normalizing differences in values between respective pixels in the third frame and the third prior frame comprises:
normalizing each pixel in the third interframe image to a value within a range of zero to one.

19. The medium of claim 15, wherein determining a third interframe image from the third prior frame and the third frame of the video comprises:
identifying regions that are not important to detection of motion by an object of interest; and
masking out the regions in the third interframe image.

20. The medium of claim 15, wherein determining a third interframe image from the third prior frame and the third frame of the video comprises:
determining a first prestacked image from the third prior frame and the third frame;

determining a second prestacked image from a fourth prior frame and a fourth frame; and determining the third interframe image based on a combination of the first prestacked image and the second prestacked image.

\* \* \* \* \*